US008555322B2

(12) United States Patent
Salomons et al.

(10) Patent No.: US 8,555,322 B2
(45) Date of Patent: Oct. 8, 2013

(54) SHARED TELEVISION SESSIONS

(75) Inventors: Edwin W. Salomons, Dublin (IE); Liam P. O'Gorman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 933 days.

(21) Appl. No.: 12/359,078

(22) Filed: Jan. 23, 2009

(65) Prior Publication Data
US 2010/0188575 A1 Jul. 29, 2010

(51) Int. Cl.
H04N 7/18 (2006.01)
(52) U.S. Cl.
USPC ............... 725/78; 725/74; 725/105; 725/109; 725/110; 725/131; 725/133; 725/151; 725/153
(58) Field of Classification Search
USPC ............. 725/105, 131, 133, 151, 153, 74, 78, 725/109–110
See application file for complete search history.

(56) References Cited

U.S. PATENT DOCUMENTS

| 5,618,045 | A | 4/1997 | Kagan et al. |
|---|---|---|---|
| 2002/0095460 | A1 | 7/2002 | Benson |
| 2003/0182663 | A1 | 9/2003 | Gudorf et al. |
| 2005/0155052 | A1 | 7/2005 | Ostrowska et al. |
| 2005/0188415 | A1* | 8/2005 | Riley ........................... 725/116 |
| 2006/0029078 | A1 | 2/2006 | Lu et al. |
| 2006/0195873 | A1* | 8/2006 | Gopalan et al. ............... 725/100 |
| 2007/0079340 | A1 | 4/2007 | McEnroe |
| 2007/0136476 | A1 | 6/2007 | Rubinstein |
| 2007/0157281 | A1* | 7/2007 | Ellis et al. ...................... 725/134 |
| 2007/0173325 | A1 | 7/2007 | Shaw et al. |
| 2007/0178884 | A1 | 8/2007 | Donovan et al. |
| 2007/0199025 | A1 | 8/2007 | Angiolillo et al. |
| 2007/0299914 | A1 | 12/2007 | Jones et al. |
| 2008/0127255 | A1 | 5/2008 | Ress et al. |
| 2008/0244637 | A1 | 10/2008 | Candelore |
| 2009/0015660 | A1 | 1/2009 | Vedantham et al. |

FOREIGN PATENT DOCUMENTS

| EP | 1699239 A2 | 9/2006 |
|---|---|---|
| JP | 2007166407 A | 6/2007 |
| KR | 100735693 B1 | 7/2007 |
| KR | 1020070099692 A | 10/2007 |

OTHER PUBLICATIONS

"International Search Report", Mailed Date: Aug. 17, 2010, Application No. PCT/US2009/069336, Filed Date: Dec. 22, 2009, pp. 9.

(Continued)

Primary Examiner — Mulugeta Mengesha
(74) Attorney, Agent, or Firm — Wolfe-SBMC

(57) ABSTRACT

Shared television sessions are described. In embodiment(s), television content can be received via a tuner of a tuner device. A shared television session can be established between rendering devices that share the tuner of the tuner device to receive the television content. A tuner configuration input can be received when initiated at a rendering device, and the tuner configuration input can be communicated to the tuner device to change the television content. The tuner device can receive different television content via the tuner according to the tuner configuration input. Tuner update data associated with the tuner configuration input can then be communicated to update the rendering devices that further share the tuner of the tuner device to receive the different television content.

20 Claims, 7 Drawing Sheets

(56) References Cited

OTHER PUBLICATIONS

"Multiroom Systems (SKY)", Retrieved at<<http://matrixsolutions.tv/streaming.html>>, Oct. 31, 2008, pp. 2.

"Foreign Office Action", Chinese Application No. 200980155489.7, (May 24, 2012), 6 pages.

"Extended European Search Report", European Patent Application No. 09839032.1, (Jun. 19, 2012), 6 pages.

* cited by examiner

SHARED TELEVISION SESSIONS

BACKGROUND

The variety of television programming and other media content that is available for viewing continues to increase. In addition to scheduled television program broadcasts, television viewing options also include video-on-demand choices and other recorded television content. A television system can include television client devices that receive the television programming and other selected media content via a broadcast network and/or an IP-based content distribution network. In a typical multi-room broadcast and/or IPTV system, such as a home or business network that includes multiple television client devices, there may be resource limitations due to the limited number of television content streams that can enter the home or business. Other resource limitations may include a limited number of broadcast tuners to receive the television content, and/or a limited available ingress bandwidth for the television content streams. These resource limitations may limit user requests to receive and view selected television programming, such as when all available tuners in a network are in use by others for television content playback and/or for recordings of the television content.

SUMMARY

This summary is provided to introduce simplified concepts of shared television sessions. The simplified concepts are further described below in the Detailed Description. This summary is not intended to identify essential features of the claimed subject matter, nor is it intended for use in determining the scope of the claimed subject matter.

Shared television sessions are described. In embodiment(s), television content can be received via a tuner of a tuner device. A shared television session can be established between rendering devices that share the tuner of the tuner device to receive the television content. A tuner configuration input can be received when initiated at a rendering device, and the tuner configuration input can be communicated to the tuner device to change the television content. The tuner device can receive different television content via the tuner according to the tuner configuration input. Tuner update data associated with the tuner configuration input can then be communicated to update the rendering devices that further share the tuner of the tuner device to receive the different television content. In an embodiment, the tuner of the tuner device can be controlled by a rendering device connected in a shared television session based on the permissions and/or configuration settings of the rendering device and the shared television session.

In other embodiment(s) of shared television sessions, a join request can be received from an additional rendering device to join a shared television session, and the additional rendering device can be joined in the shared television session to receive the television content via the tuner of the tuner device. The additional rendering device can be joined in the shared television session if an approval of the join request is received from each rendering device that is already connected in the shared television session. Alternatively or in addition, the additional rendering device can be joined in the shared television session based on established permissions associated with the additional rendering device to join with each device that is connected in the shared television session. In other embodiments, the television content that is being displayed for viewing at one of the rendering devices connected in the shared television session can be monitored from another of the rendering devices based on the permissions and/or configuration settings of one or both of the devices.

BRIEF DESCRIPTION OF THE DRAWINGS

Embodiments of shared television sessions are described with reference to the following drawings. The same numbers are used throughout the drawings to reference like features and components.

DETAILED DESCRIPTION

Embodiments of shared television sessions provide that television content can be shared from tuner devices that receive television content to rendering devices that do not have tuners to receive the television content. In a home or business environment, a tuner device can receive IPTV content and/or over-the-air broadcast television content. A shared television session can be established between rendering devices that receive the television content via a tuner or other functionality of the tuner device. In an embodiment, the tuner of the tuner device can be controlled by a rendering device connected in the shared television session based on the permissions and/or configuration settings of the rendering device and the shared television session. Other rendering devices can also initiate a join request to join a shared television session and receive the television content via the tuner of the tuner device.

When several devices share a tuner, resource conflicts are likely, and rather than deny a user a viewing request if a tuner in a system is already in use by other viewers or for recording, the user can initiate joining a different shared television session to share viewing with other viewers. In addition, a single user can utilize only one tuner of a tuner device to have the same television content displayed for viewing at multiple devices, such as displayed throughout a home or business environment. A resource conflict can be resolved by providing optional shared television sessions that a user can join for shared viewing, rather than providing the many possible reasons for the resource conflict and expecting the user to sort out and resolve the resource conflict.

While features and concepts of the described systems and methods for shared television sessions can be implemented in any number of different environments, systems, and/or various configurations, embodiments of shared television sessions are described in the context of the following example systems and environments.

Figure 1:
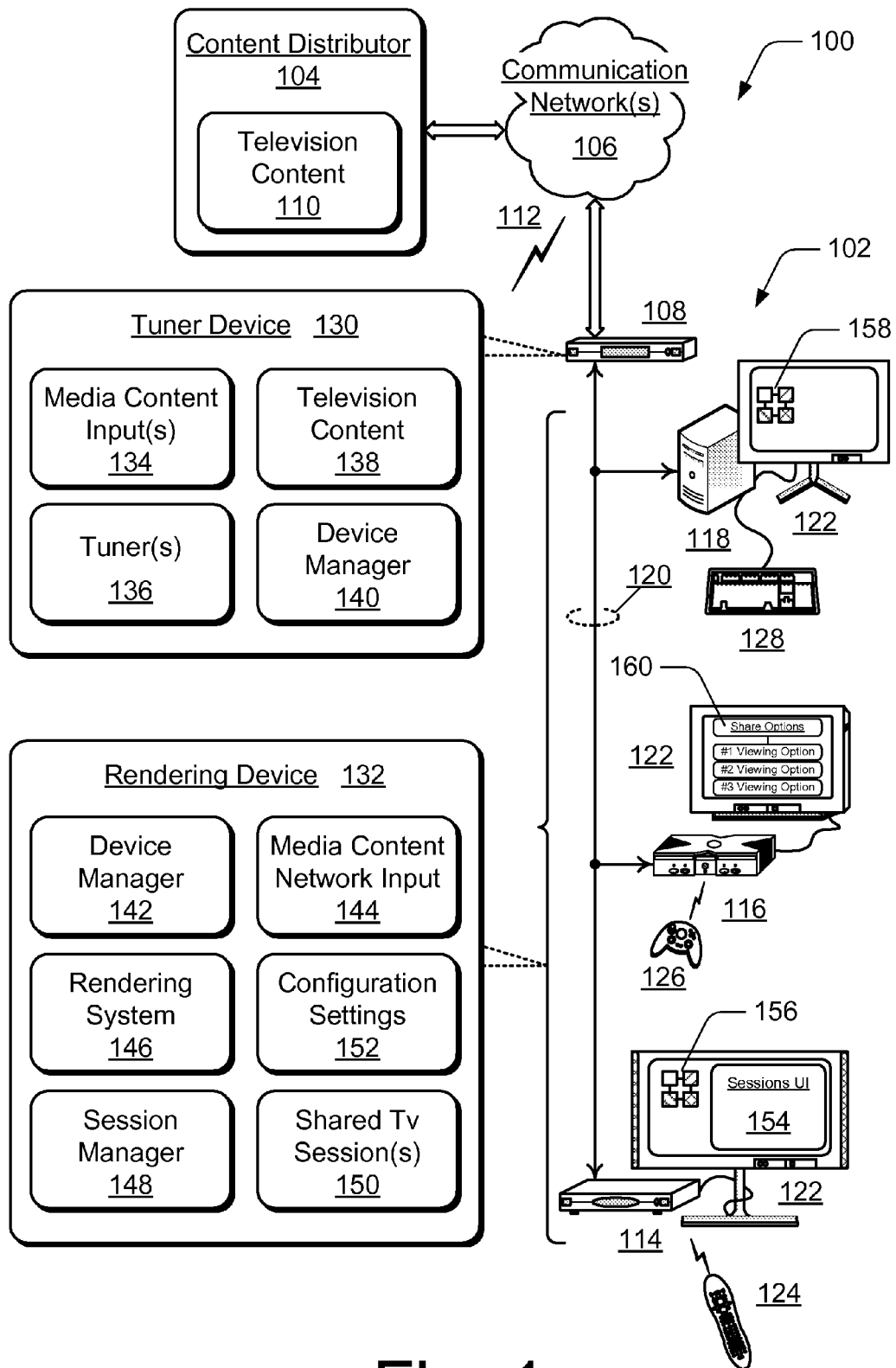
FIG. 1 illustrates an example system in which embodiments of shared television sessions can be implemented.

FIG. 1 illustrates an example system 100 in which various embodiments of shared television sessions can be implemented. Example system 100 includes a shared session network 102 of various devices, such as in a home or business environment that includes multiple networked devices.

Example system 100 also includes a content distributor 104 that is implemented for communication via communication networks 106 with a tuner device 108 of the shared session network 102. The tuner device 108 is an example of a device that includes a tuner via which to receive television content, and in an embodiment, can be implemented as a television client device. The shared session network 102 can include any number of co-located tuner devices and rendering devices.

A tuner device includes a tuner to receive television content and can be implemented as a resource to rendering devices that are connected in a shared television session. The rendering devices can be implemented to join, manage, and arbitrate resources for a shared television session. In various embodiments, the term tuner at a tuner device designates other various shared resources, such as bandwidth to share television content with rendering devices connected in a shared television session. In addition, a tuner device may not include a tuner, but rather can be implemented with software or other functionality that, in effect, tunes to television content. For example, a device such as an IPTV receiver can receive television content via an Ethernet input port. The receiver can then disseminate the television content without a tuner to share the television content with rendering devices connected in a shared television session.

In a media content distribution system, the content distributor 104 facilitates distribution of television content 110, content metadata, media content, and/or other associated data to multiple viewers, users, customers, subscribers, viewing systems, and/or client devices. The communication networks 106 can include any type of a data network, voice network, broadcast network, an IP-based network, and/or a wireless network 112 that facilitates communication of data in any format. The communication networks 106 (to include wireless network 112) can be implemented using any type of network topology and/or communication protocol, and can be represented or otherwise implemented as a combination of two or more networks. In addition, any one or more of the arrowed communication links facilitate two-way data communication.

Media content (e.g., to include recorded media content) can include any type of audio, video, and/or image media content received from any media content source. As described herein, media content can include recorded video content, video-on-demand content, television content, television programs (or programming), advertisements, commercials, music, movies, video clips, and other on-demand media content. Other media content can include interactive games, network-based applications, and any other content or data (e.g., to include program guide application data, user interface data, advertising content, closed captions data, content metadata, search results and/or recommendations, etc.).

In this example, the shared session network 102 includes various rendering devices, such as a television client device 114, a gaming device 116, and a computer device 118 that are all implemented for data communication via local network connectivity 120. The various devices are implemented as components in client systems that each include a respective display device 122, and a rendering device and display device together render or playback any form of audio, video, and/or image content. A display device 122 can be implemented as any type of a television, high definition television (HDTV), LCD, or similar display system. The various television, gaming, and computer devices can also be associated with one or more input devices, such as a remote control device 124 for user-selectable inputs to television client device 114, a gaming controller 126 for user-selectable inputs to gaming device 116, and a keyboard 128 (and/or mouse input device) for user-selectable inputs to computer device 118.

In an embodiment of shared television sessions, the shared session network 102 can include tuner devices that are implemented with tuners, and can include devices that do not have tuners (e.g., also referred to as rendering devices). An example tuner device 130 is representative of tuner devices, such as the tuner device 108 in shared session network 102. An example rendering device 132 is representative of rendering devices, such as the television client device 114, gaming device 116, and computer device 118 in shared session network 102. Any of the devices described herein can be implemented with one or more processors, communication components, data inputs, memory components, processing and control circuits, and/or a media content rendering system. A device can also be implemented with any number and combination of differing components as described with reference to the example device shown in FIG. 7.

In this example, tuner device 130 includes media content inputs 134 and one or more tuners 136 to receive media content from content distributor 104, such as television content 138. The media content inputs 134 can include any type of communication interfaces and/or data inputs, such as Internet Protocol (IP) inputs over which streams of television content (e.g., IPTV content) are received via an IP-based network. A media content input 134 can receive television content 138 as an IPTV multicast from content distributor 104. In addition, the media content inputs 134 can include any type of broadcast and/or over-the-air inputs via which media content is received over the air. Tuner device 130 can also include a device manager 140 (e.g., a control application, software application, signal processing and control module, code that is native to a particular device, a hardware abstraction layer for a particular device, etc.).

In this example, rendering device 132 is representative of the rendering devices in the shared session network 102 and can also be implemented with one or more processors, communication components, data inputs, memory components, processing and control circuits, and/or any of the differing components as described with reference to the example device shown in FIG. 7. Rendering device 132 can include a device manager 142 as described with reference to device manager 140 at tuner device 130. Rendering device 132 also includes a media content network input 144 to receive media content, such as television content 138 via a tuner 136 of a tuner device 130 when connected in a shared television session.

Rendering device 132 includes a rendering system 146 to receive and render the television content 138 for display when the television content 138 is received from the tuner device 130. The rendering system 146 can also be implemented to render a user interface for display to implement embodiments of shared television sessions. Rendering device 132 also includes a session manager 148 that can be implemented as computer-executable instructions and executed by processors to implement embodiments and/or features of shared television sessions. In an implementation, the session manager 148 can be implemented as a component or module of the device manager 142.

In embodiments, the session manager 148 can be implemented to establish a shared television session 150 between rendering devices (e.g., television client device 114, gaming device 116, and computer device 118) in a shared television session. The rendering devices connected in a shared television session share a tuner 136 of the tuner device 130 to receive the television content 138. Rendering device 132 also includes configuration settings 152 for the device. The configuration settings can include permissions and/or session settings that correspond to respective ones of the shared television sessions for a rendering device.

In addition, the rendering devices in the shared session network 102 can each include a pause buffer to temporarily record the television content as it is being received. Alternatively and/or in addition, a tuner device can include a pause buffer that is accessed by other rendering devices connected in a shared television session. Each of the devices in the shared session network 102 can also be implemented with independent DVR control to playback television content for viewing.

In embodiments, the session manager 148 at a rendering device 132 can be implemented to initiate a display of a sessions user interface 154 to display user-selectable options, inputs, and/or configuration settings for the shared television sessions 150 and devices connected in the shared session network 102. For example, a sessions user interface 154 can be displayed on the display device 122 that is associated with television client device 114. The sessions user interface 154 includes a display of a configuration representation 156 of a shared television session, and the configuration representation includes images that each represent a device connected in the shared television session. The images or logos that each represent a device connected in a shared television session in the configuration representation 156 can also be color-coded or include any other distinct visual feature to indicate permissions, session settings, configuration settings, tuner control, and the like.

A sessions user interface can be displayed on any of the display devices 122 to display user-selectable options, inputs, permissions, configuration settings, and/or session settings for respective shared television sessions. For example, a configuration representation 158 of a shared television session is shown displayed on the display device 122 that is associated with computer device 118. In another example, a menu of viewing options 160 is displayed at gaming device 116 as one example of a sessions user interface 154. A user can select a shared television session as a viewing option for shared viewing from a list of available tuners, resources, and/or shared television sessions. In an embodiment, a sessions user interface 154 can display user-selectable viewing options that include existing shared television sessions that a user can select to join. The session manager 148 of a rendering device connected in a shared television session can receive a join request from an additional rendering device that is requesting to join the shared television session. The session manager 148 can then join the additional rendering device in the shared television session to receive the television content via a tuner 136 of the tuner device 130 (e.g., tuner device 108) and display the television content for viewing at the additional rendering device.

The sessions user interface 154 can be displayed at any of the devices connected in the shared session network 102 to display various shared television session information. In one instance, the sessions user interface 154 can include a list of available shared television sessions and viewing options, as well as an indication of the current devices and/or viewers in a shared television session, and the associated television channel for the shared viewing. In another instance, the sessions user interface 154 can include a menu option to join a shared television session, or options to join multiple shared television sessions at once. Multiple shared television sessions can be displayed in a mosaic screen with a focus to highlight a particular session for selection from the sessions user interface.

In another instance of the sessions user interface 154, a menu option for a user to initiate sharing a shared television session can be included. For example, a user at a device can initiate sharing television content with other viewers, and the user can select any of the other rendering devices connected in the shared session network 102 from the sessions user interface 154. In an embodiment, a user can select all of the other devices connected in the shared session network 102 to have the same television content displayed for viewing throughout a home or business environment. In an embodiment, a sessions user interface 154 can display available rendering devices that a user can select to join a shared television session, and the session manager 148 can receive join selections to join selected ones of the available rendering devices in the shared television session. The session manager 148 can then join the selected ones of the available rendering devices in the shared television session to receive the television content 138 via a tuner 136 of the tuner device 130 and display the television content for viewing at the selected ones of the available rendering devices.

A user selection or control input to a user interface can be initiated with an input device, such as with the keyboard 128, a mouse, or other pointing device at computer device 118. A user control input can also be initiated with the remote control device 124 at television client device 114, or with the game controller 126 at gaming device 116. An input device can include various shared television session input controls. For example, the remote control device 124 can include a join input control to initiate joining a shared television session, and can include an unjoin input control to initiate leaving or disconnecting from a shared television session. Alternatively, a user at a tuner device can initiate an unjoin input control to request that other connected devices disconnect from receiving television content via a tuner of the tuner device. Alternatively and/or in addition, the remote control device 124 can include a lock-unlock tuner input control to initiate gaining temporary control of the tuner for a shared television session.

In embodiments of shared television sessions, the session manager 148 at a rendering device 132 can be implemented to receive a join request from an additional rendering device that is requesting to join a shared television session 150. The session manager 148 can then join the additional rendering device in the shared television session 150 to receive the television content 138 via a tuner 136 of the tuner device (e.g., tuner device 130). In an embodiment, the requesting device can be joined in the shared television session 150 based on established configuration settings and/or permissions associated with the device to join with each rendering device that is already connected in the shared television session. For example, a first subset of the rendering devices connected in a shared television session can be permissioned to initiate a tuner configuration input to change the television content at the tuner device 130, and a second subset of the rendering devices connected in the shared television session are not permissioned to initiate a tuner configuration input.

Alternatively and/or in addition, the requesting device can be joined in the shared television session 150 if an approval of the join request is received from each rendering device that is already connected in the shared television session. For example, a user at gaming device 116 may initiate a join request to join a shared television session 150 in the shared session network 102, and users at the television client device 114 and the computer device 118 can initiate approvals for gaming device 116 to join the shared television session. Approval of a join request for a device to join a shared television session by all of the current devices that are connected in a shared television session can be implemented for the privacy of the viewers that are currently watching television content in the shared television session.

In one instance of the sessions user interface 154, the user interface can include join allow options that are displayed at a device connected in a shared television session when a join request is received from an additional device that is requesting to join the shared television session. The session manager 148 at a rendering device that is connected in a shared television session can initiate a display of the join request from an additional rendering device at the rendering devices that are connected in the shared television session. The session manager 148 can then receive a join accept input or join denied input from users at the rendering devices that are connected in the shared television session, and deny joining the additional rendering device in the shared television session if a join denied input is received.

The join allow options can include a prompt to allow a new user to join for viewing the television content, allow the new user to join for viewing with tuner control, or not allow the new user to join. Additionally, the sessions user interface 154 can include an option to change the current channel before allowing the new user to join the shared television session. In another instance, the sessions user interface 154 can include a join accept selection to accept a join invitation when a user at a device that is connected in a shared television session initiates a join invitation to a user at a device that is not connected in the shared television session.

A user that turns on a device when a resource (e.g., a tuner or bandwidth) is not available can be provided an option to join other shared television sessions 150 in the shared session network 102 that are available to join and that are not disabled from joining. If a shared television session is joined with tuner control for channel change enabled, remote control commands from both rendering devices can initiate a channel change input which will be displayed to both users at the respective devices. Additionally, each user has an option to unjoin a shared television session, such as when resources become available for independent use.

In embodiments of shared television sessions, the session manager 148 at a rendering device 132 can be implemented to monitor what is being displayed for viewing at another device that is connected in a shared television session. A device can include configuration settings that allow joining a shared television session quietly, with notification, with a prompt, or the device can be disabled from receiving join requests to preclude other users from viewing the television content that is shared for viewing. When joining a shared television session quietly, a user at one device in the shared session network 102 can view the television content that is being displayed for viewing at another device without the viewer at the other device knowing. For example, a device in a child's room can be configured by a parent to allow for quiet viewing, and the parent can then look-in from another device to view the television content that is displayed for viewing through the device in the child's room.

Alternatively, a user at a device in the shared session network 102 can view the television content that is being displayed for viewing at another device with notification to the viewer at the other device so that the viewer is aware the television content is being monitored. In another instance, a device that is connected in a shared television session 150 can receive a join request and a selectable prompt is displayed that a user can then select to initiate allowing others to monitor the television content that is being displayed for viewing, and join the shared television session.

In another instance of the sessions user interface 154, the user interface can include an unjoin notification to other users if a tuner becomes available, in which case a user may want to initiate another shared television session to receive different television content for viewing. Alternatively, an unjoin notification can be initiated to end a shared television session. For example, a user at tuner device 108 can initiate an unjoin notification that is communicated to viewers at rendering devices that are connected in a shared television session 150 to disconnect the other devices.

In embodiments of shared television sessions, the session manager 148 at a rendering device 132 can be implemented to establish ranked permissions to control the tuner of a tuner device for each device that is connected in a shared television session. The configuration settings 152 at rendering device 132 can include session settings and permissions for a particular device in the shared session network 102. Permissions that correspond to a device and/or to a user that is associated with a particular device can be utilized to control access when a join request is received to join a shared television session. The configuration settings 152 can also be protected with a pin code (personal identifier number). In an implementation, one device connected in a shared television session 150 can be selected to have full tuner control to change channels and initiate recordings. Alternatively or in addition, the devices that are connected in the shared television session 150 can be ranked by the permissions that correspond to the respective devices and/or the users that are associated with the devices, such as identified by a login code.

When a channel is changed at a device connected in a shared television session 150 to a channel that has been configured for parental control, a pin code can be entered by users at all of the other rendering devices that are connected in the shared television session. Only the users at the various respective devices that enter the correct pin code will then receive the television content for viewing on the particular channel. Alternatively, the shared television session may be configured such that only one of the users at the other devices connected in the shared television session enters the pin code for the other users to receive the television content at the respective devices.

In another instance of the sessions user interface 154, the user interface can include selectable configuration settings and, optionally a pin code entry region in which a user can enter a pin code to unlock the configuration settings. The sessions user interface 154 can include configuration settings for the various join options to allow joining a shared television session quietly, with notification, with a prompt, or the device can be disabled from receiving join requests. Configuration settings for join options can also include allowing for a request to share television content, and allowing other users to join as viewers only, or as viewers with tuner input control, such as to change channels and initiate recordings. The configuration settings can also include degrees of priority, such as low, medium, and high.

In embodiments, the device configuration settings 152 at a rendering device 132 can include an option for allocation of tuner control, such as whether to allocate channel change control to a rendering device that joins a shared television session, or to allocate control to the rendering device and the associated user that first utilizes the resource. The session manager 148 at rendering device 132 can receive a tuner control input from the gaming device 116 to initiate an input to a tuner 136 of the tuner device 108 via which the television content 138 is received at the gaming device 116.

Tuner control inputs can include a channel change input, a DVR content control input (e.g., pause, rewind, fast-forward, play, etc.), or an input to schedule a recording, any of which may cause a resource conflict that can be mitigated by the session manager 148. In an embodiment, the session manager 148 at a rendering device in the shared session network 102 can receive a tuner configuration input to initiate a channel change, and then initiate communication of tuner update data associated with the tuner configuration input to update the other rendering devices connected in a shared television session and indicate the channel change. In an embodiment, the other devices in the shared television session can then sync to receive the shared television content via an addressable data stream.

In embodiments of shared television sessions, the session manager 148 at a rendering device 132 can be implemented to detect a resource conflict for a shared television session, such as between two rendering devices over use of a tuner. The session manager 148 can also be implemented to then initiate a display of user-selectable viewing options that each resolve the resource conflict when a viewing option is selected. For example, the display of user-selectable viewing options can include displaying the options at the rendering devices that share the tuner which is utilized for the shared television session. Alternatively and/or in addition, the session manager 148 can initiate communication of the user-selectable viewing options for display at the rendering devices, such as the user interface of other viewing options 160, any one of which can be selected to mitigate the resource conflict by connecting in a different shared television session.

The session manager 148 can resolve the resource conflict according to a selected viewing option that is received from a user at a rendering device. A resource conflict may also occur when several devices are connected in a shared television session to receive television content via a tuner and a scheduled recording starts at the tuner device. The rendering devices that are part of the shared television session lose the option to receive the television content via the tuner that is now utilized for the recording, and the devices can unjoin the current shared television session and/or join a different shared television session.

In another instance of the sessions user interface 154, the user interface can include conflict resolution options when a resource conflict is detected, such as when a recording is started or a channel change is initiated. The conflict resolution options displayed at any of the various devices connected in a shared television session in the shared session network 102 can include user selections to cancel the recording, or join another shared television session for shared viewing and/or control of the television content.

In an embodiment of shared television sessions, the session manager 148 can be implemented to track and maintain a television content viewing history for a rendering device connected in the shared session network 102. For example, a history of channel changes and/or selected television content can be stored for future access to monitor a child's television viewing. In another instance of the sessions user interface 154, the user interface can include an image, graphic, and/or textual history of television viewing corresponding to a device in the shared session network.

In other embodiments of shared television sessions, the session manager 148 can be implemented to synchronize the audio and visual content at several devices in the shared session network 102 to share the same television content throughout a number of different rooms in a home or business environment without audio latencies in the system. Additionally, the shared session network 102 can be implemented to communicate audio, text, and/or instant messages between various devices that are connected in a shared television session. In another embodiment, the concepts and features of a shared television session can be extended to devices beyond those connected in the shared session network 102. For example, a device can be included in a shared television session when a user is joined remotely, and control data for a channel of television content of a shared television session can be communicated via the communication networks 106 along with the corresponding audio to the remote device.

Example methods 200-600 are described with reference to respective FIGS. 2-6 in accordance with one or more embodiments of shared television sessions. Generally, any of the functions, methods, procedures, components, and modules described herein can be implemented using hardware, software, firmware, fixed logic circuitry, manual processing, or any combination thereof. A software implementation of a function, method, procedure, component, or module represents program code that performs specified tasks when executed on a computing-based processor. The method(s) may be described in the general context of computer-executable instructions, which can include software, applications, routines, programs, objects, components, data structures, procedures, modules, functions, and the like.

The methods may also be practiced in a distributed computing environment where functions are performed by remote processing devices that are linked through a communication network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 2:
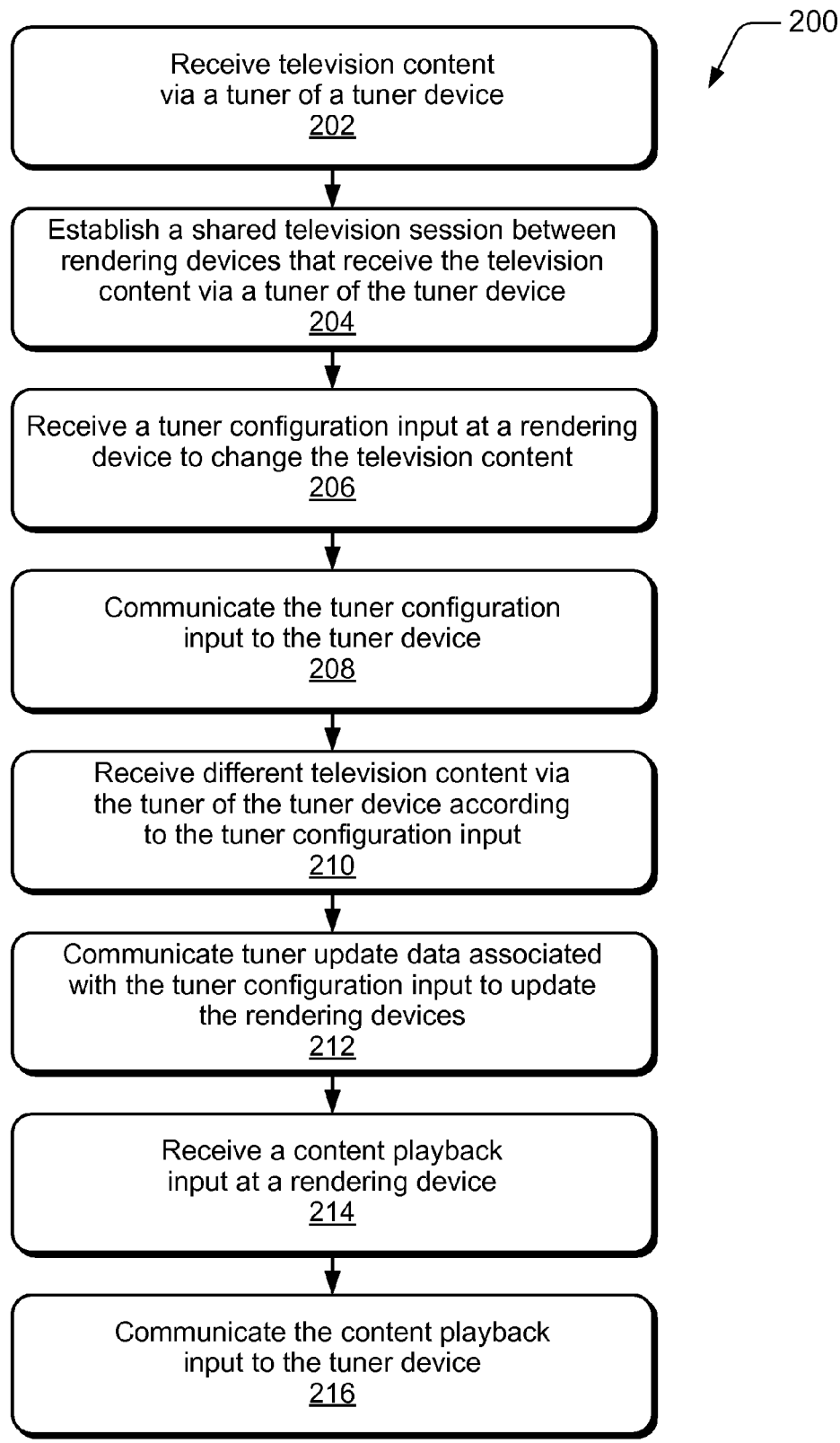
FIG. 2 illustrates example method(s) for shared television sessions in accordance with one or more embodiments.

FIG. 2 illustrates example method(s) 200 of shared television sessions. The order in which the method is described is not intended to be construed as a limitation, and any number of the described method blocks can be combined in any order to implement the method, or an alternate method.

At block 202, television content is received via a tuner of a tuner device. For example, the shared session network 102 (FIG. 1) includes a tuner device 108 that includes a tuner to receive television content, and the shared session network 102 includes rendering devices that do not have tuners. The example tuner device 130 is representative of a tuner device in the shared session network 102, such as tuner device 108. The tuner device 130 includes media content inputs 134 to receive television content 138 as an IPTV multicast, or as any type of broadcast and/or over-the-air inputs. Example rendering device 132 is representative of the rendering devices in the shared session network 102, such as the television client device 114, gaming device 116, and the computer device 118.

At block 204, a shared television session is established between rendering devices that share the tuner of the tuner device to receive the television content. For example, session manager 148 at rendering device 132 establishes a shared television session 150 between the rendering devices that share a tuner 136 of the tuner device 130 to receive the television content 138. Rendering device 132 includes a media content network input 144 to receive television content 138 via a tuner 136 of the tuner device 130.

At block 206, a tuner configuration input is received at a rendering device to change the television content. For example, a user at a rendering device that is connected in the shared television session can initiate a tuner configuration input to change the television content that is received at the tuner device 130. In a shared television session, a subset of the rendering devices can be permissioned to initiate a tuner configuration input to change the television content at the tuner device, while another subset of the rendering devices may not be permissioned to initiate a tuner configuration input.

At block 208, the tuner configuration input is communicated to the tuner device. For example, the session manager 148 at a rendering device 132 communicates the tuner configuration input to the tuner device 130 to initiate the tuner configuration change, such as a channel change. At block 210, different television content is received via the tuner of the tuner device according to the tuner configuration input.

At block 212, tuner update data associated with the tuner configuration input is communicated to update the rendering devices. For example, the session manager 148 at rendering device 132 initiates communication of tuner update data to the other rendering devices connected in the shared television session that receive the tuner update data and configure to further share the tuner of the tuner device to receive the different television content.

At block 214, a content playback input is received at a rendering device. For example, a user at a rendering device can initiate a content playback input to control a playback position of the television content and/or to control a playback speed of the television content. At block 216, the content playback input is communicated to the tuner device. For example, the session manager 148 at rendering device 132 initiates communication of the content playback input to the tuner device, and the rendering devices connected in the shared television session then receive the television content according to the content playback input.

Figure 3:
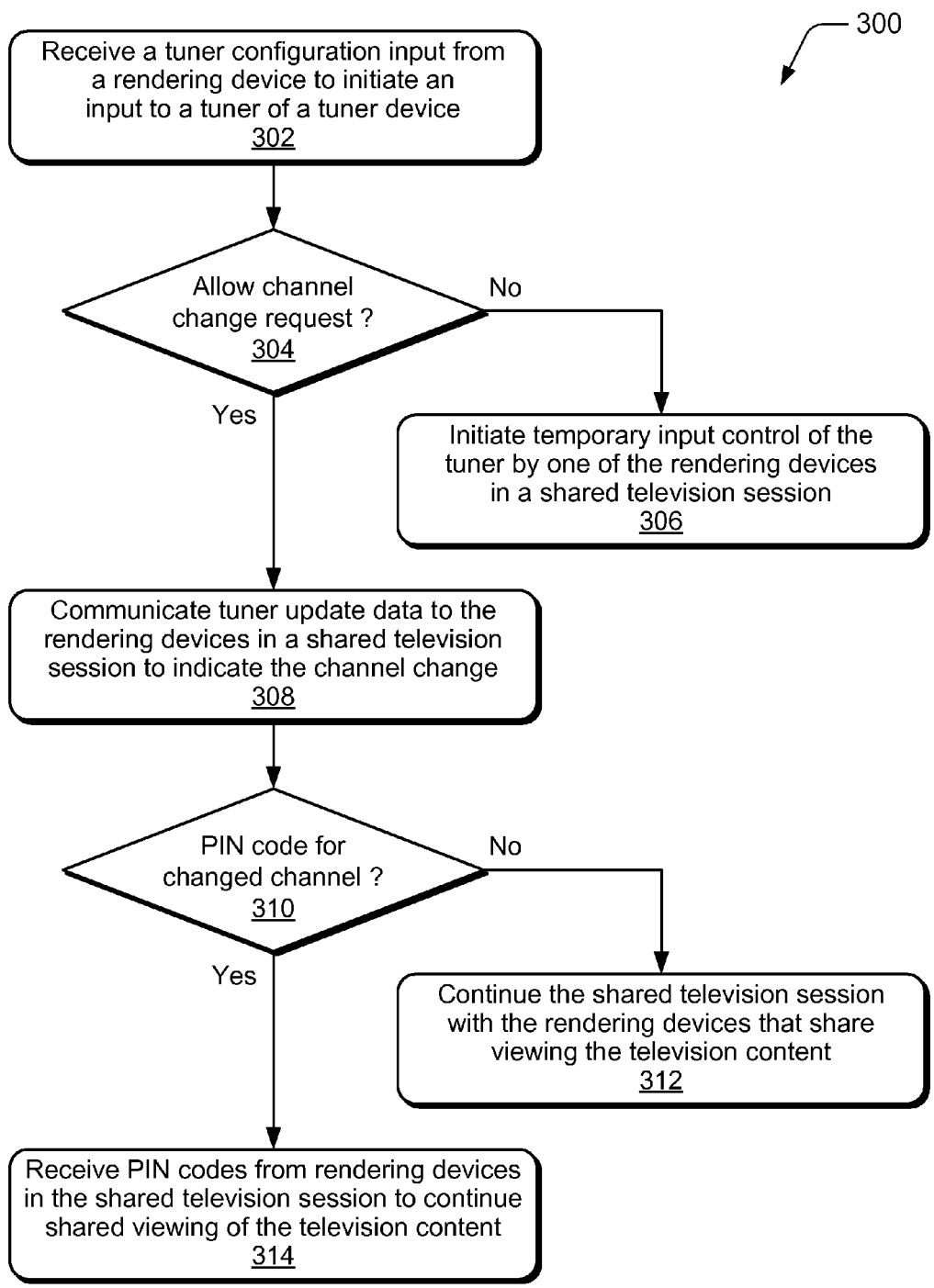
FIG. 3 illustrates example method(s) for shared television sessions in accordance with one or more embodiments.

FIG. 3 illustrates example method(s) 300 of shared television sessions. The order in which the method is described is not intended to be construed as a limitation, and any number of the described method blocks can be combined in any order to implement the method, or an alternate method.

At block 302, a tuner configuration input is received from a rendering device to initiate an input to a tuner of a tuner device. For example, a user at a rendering device that is connected in the shared television session can initiate a tuner configuration input to configure the tuner 136 at tuner device 130. The session manager 148 at a rendering device 132 receives the tuner configuration input from a rendering device, and the tuner configuration input can include a channel change input, an input to schedule a recording, or other type of tuner configuration input.

At block 304, a determination is made as to whether to allow a channel change request (e.g., the tuner configuration input). If the channel change request is not allowed (i.e., "no" from block 304), then at block 306, temporary input control of the tuner is initiated by one of the rendering devices in a shared television session. For example, remote control device 124 can include a lock-unlock tuner input control to initiate gaining temporary control of the tuner for a shared television session.

If the channel change request (e.g., the tuner configuration input) is allowed (i.e., "yes" from block 304), then at block 308, tuner update data is communicated to the rendering devices in a shared television session to indicate the channel change. For example, session manager 148 at a rendering device in the shared session network 102 receives a tuner configuration input to initiate a channel change, and then communicates tuner update data (e.g., the configuration settings 152) to the other rendering devices connected in a shared television session to indicate the channel change. In an embodiment, the other rendering devices in the shared television session can then sync to receive the shared television content, such as via an addressable data stream.

At block 310, a determination is made as to whether the changed channel is protected with a pin code. If the changed channel does not need a pin code to display the television content for viewing (i.e., "no" from block 310), then at block 312, the shared television session is continued with the rendering devices that share receiving the television content to display for viewing. However, if the changed channel is protected with a pin code (i.e., "yes" from block 310), then at block 314, pin codes are received from the rendering devices connected in the shared television session when input by respective users that enter a pin code to continue receiving the television content for shared viewing.

For example, when a channel is changed at a rendering device connected in a shared television session to a channel that has been configured for parental or monitored control, a pin code can be entered by users at all of the other rendering devices that are connected in the shared television session. Only the users at the various respective devices that enter the correct pin code will then receive the changed or different television content for viewing on the particular channel. Alternatively, the shared television session may be configured such that only one of the users at one of the other rendering devices connected in the shared television session enters the pin code for all of the other users to receive the changed television content at the respective rendering devices. A pin code can be entered by a user with an input device, such as with the keyboard 128, a mouse, or other pointing device at computer device 118. A pin code can also be entered with the remote control device 124 at television client device 114, or with the game controller 126 at gaming device 116.

Figure 4:
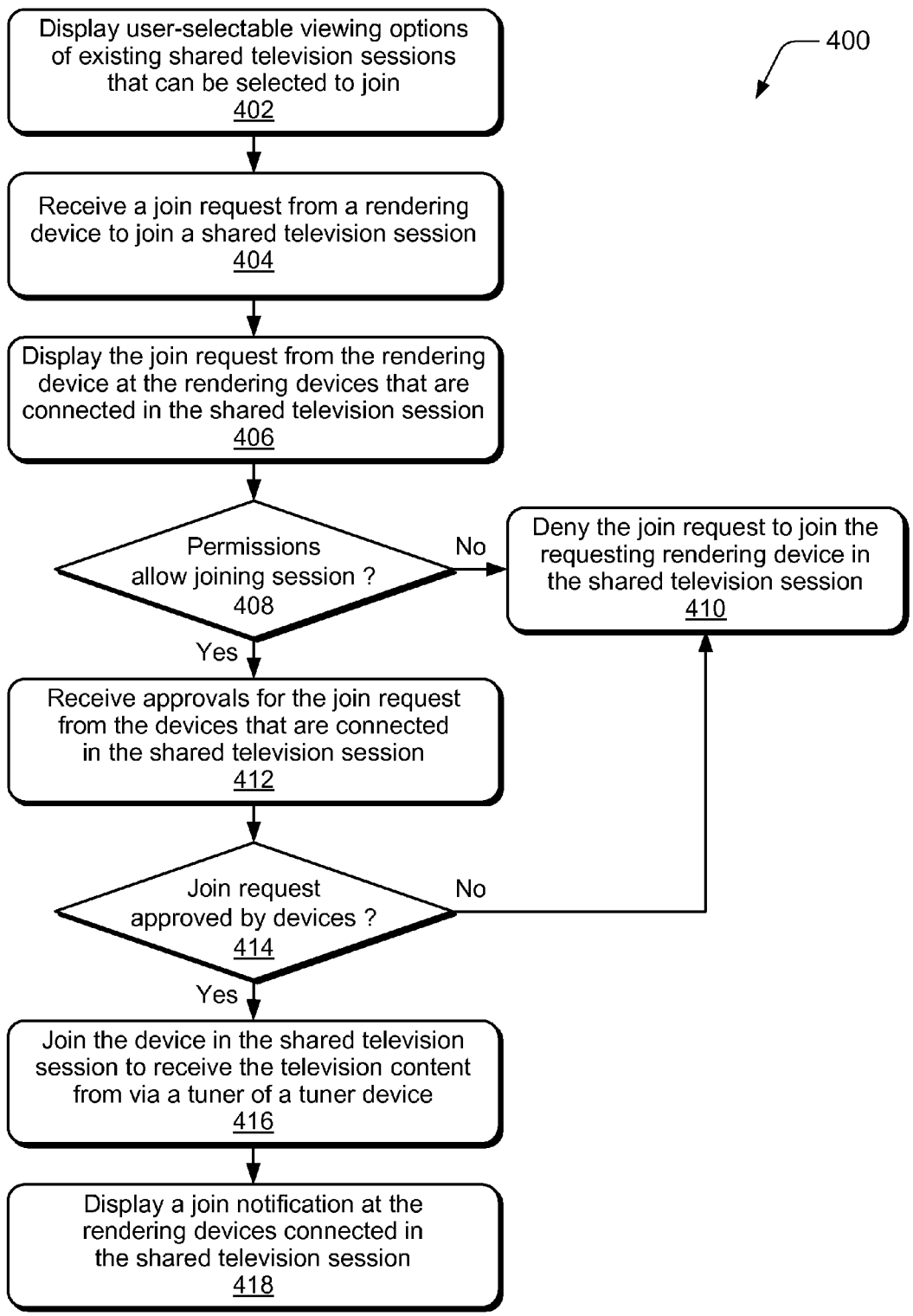
FIG. 4 illustrates example method(s) for shared television sessions in accordance with one or more embodiments.

FIG. 4 illustrates example method(s) 400 of shared television sessions. The order in which the method is described is not intended to be construed as a limitation, and any number of the described method blocks can be combined in any order to implement the method, or an alternate method.

At block 402, user-selectable viewing options of existing shared television sessions that can be selected to join are displayed. For example, a display of existing shared television sessions can be displayed at additional rendering devices that are not connected in a shared television session, and a user at a rendering device can select a viewing option to join a shared television session. In an embodiment, the menu of viewing options can be displayed on a display device 122 at a rendering device and a user can select a viewing option.

At block 404, a join request is received from a rendering device to join a shared television session. For example, session manager 148 at a rendering device 132 connected in the shared television session receives a join request from a rendering device that is requesting to join a shared television session 150 when initiated by a user at the rendering device. At block 406, the join request from the rendering device is displayed at the rendering devices that are connected in the shared television session. For example, session manager 148 at rendering device 132 initiates communication of the join request for display at the rendering devices connected in the shared television session.

At block 408, a determination is made as to whether the requesting rendering device has established permissions to join with each rendering device that is connected in the shared television session. In an embodiment, a requesting rendering device can be joined in a shared television session 150 based on established configuration settings 152 and/or permissions associated with the device to join with each rendering device that is already connected in the shared television session. In addition to the session manager 148 determining whether the requesting rendering device has corresponding permission settings (e.g., configuration settings 152) that allow the rendering device to join the shared television session, the session manager can also determine whether the rendering devices connected in the shared television session have corresponding permission settings that allow the requesting rendering device to join them in the shared television session.

If the requesting rendering device does not have permissions to join the shared television session (i.e., "no" from block 408), then at block 410, the join request to join the shared television session is denied. For example, a requesting rendering device can be denied from joining in a shared television session according to permission settings, or if a join denied input is received.

If the requesting rendering device does have permissions to join the shared television session (i.e., "yes" from block 408), then at block 412, approvals of the join request are received from each rendering device that is connected in the shared television session. In an embodiment, the requesting device can be joined in the shared television session if an approval of the join request is received from each rendering device that is already connected in the shared television session. For example, a user at gaming device 116 may initiate a join request to join a shared television session in the shared session network 102 that includes television client device 114 and computer device 118, and users at the rendering devices can initiate approvals for gaming device 116 to join the shared television session.

At block 414, a determination is made as to whether the join request is approved by each of the rendering devices connected in the shared television session. If the join request is not approved by each of the rendering devices connected in the shared television session (i.e., "no" from block 414), then at block 410, the join request from the requesting rendering device to join the shared television session is denied. However, if the join request is approved by each of the rendering devices connected in the shared television session (i.e., "yes" from block 414), then at block 416, the requesting rendering device is joined in the shared television session to receive the television content via a tuner of a tuner device. For example, session manager 148 joins the requesting device in the shared television session 150 to receive television content 138 via a tuner 136 of a tuner device (e.g., tuner device 108), and the joined rendering device can display the television content for viewing.

At block 418, a join notification is displayed at the rendering devices connected in the shared television session to indicate that the requesting rendering device is joining the shared television session. In another embodiment, an unjoin notice can be communicated to a rendering device in the shared television session to indicate that other resources (e.g., one or more tuners) are available from which to receive television content. For example, the sessions user interface 154 can include an unjoin notification to other users if a tuner becomes available, in which case a user may want to initiate joining another shared television session to receive different television content for viewing. Alternatively, an unjoin notification can be initiated to end a shared television session. For example, a user at rendering device in a shared television session can initiate an unjoin notification that is communicated to viewers at other devices connected in the shared television session to unjoin the other rendering devices from the session.

Figure 5:
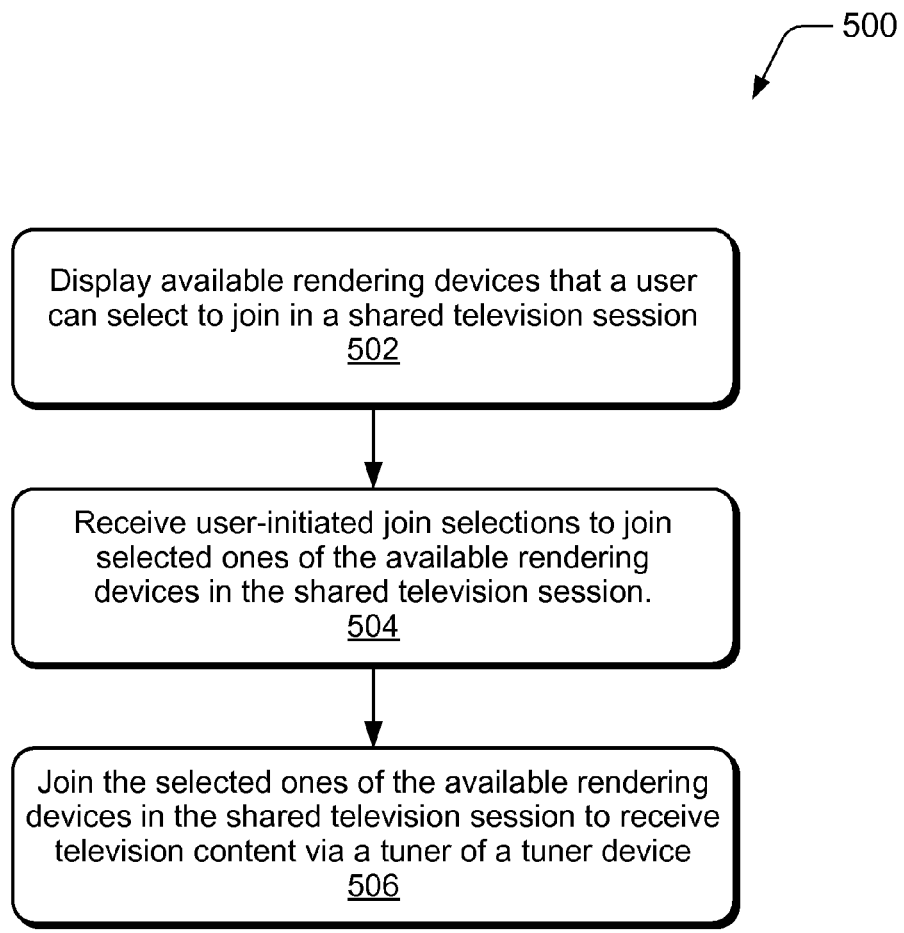
FIG. 5 illustrates example method(s) for shared television sessions in accordance with one or more embodiments.

FIG. 5 illustrates example method(s) 500 of shared television sessions. The order in which the method is described is not intended to be construed as a limitation, and any number of the described method blocks can be combined in any order to implement the method, or an alternate method.

At block 502, available rendering devices are displayed that a user can select to join in a shared television session. For example, a sessions user interface 154 can display available rendering devices (e.g., devices not connected in a shared television session) that a user can select to join a shared television session.

At block 504, user-initiated join selections are received to join selected ones of the available rendering devices in the shared television session and, at block 506, selected ones of the available rendering devices are joined in the shared television session to receive the television content via the tuner of the tuner device. For example, the session manager 148 at a rendering device 132 can receive join selections to join selected ones of the available rendering devices in a shared television session. The session manager 148 can then join the selected ones of the available rendering devices in the shared television session to receive the television content 138 via a tuner 136 of the tuner device 130 and display the television content for viewing.

Figure 6:
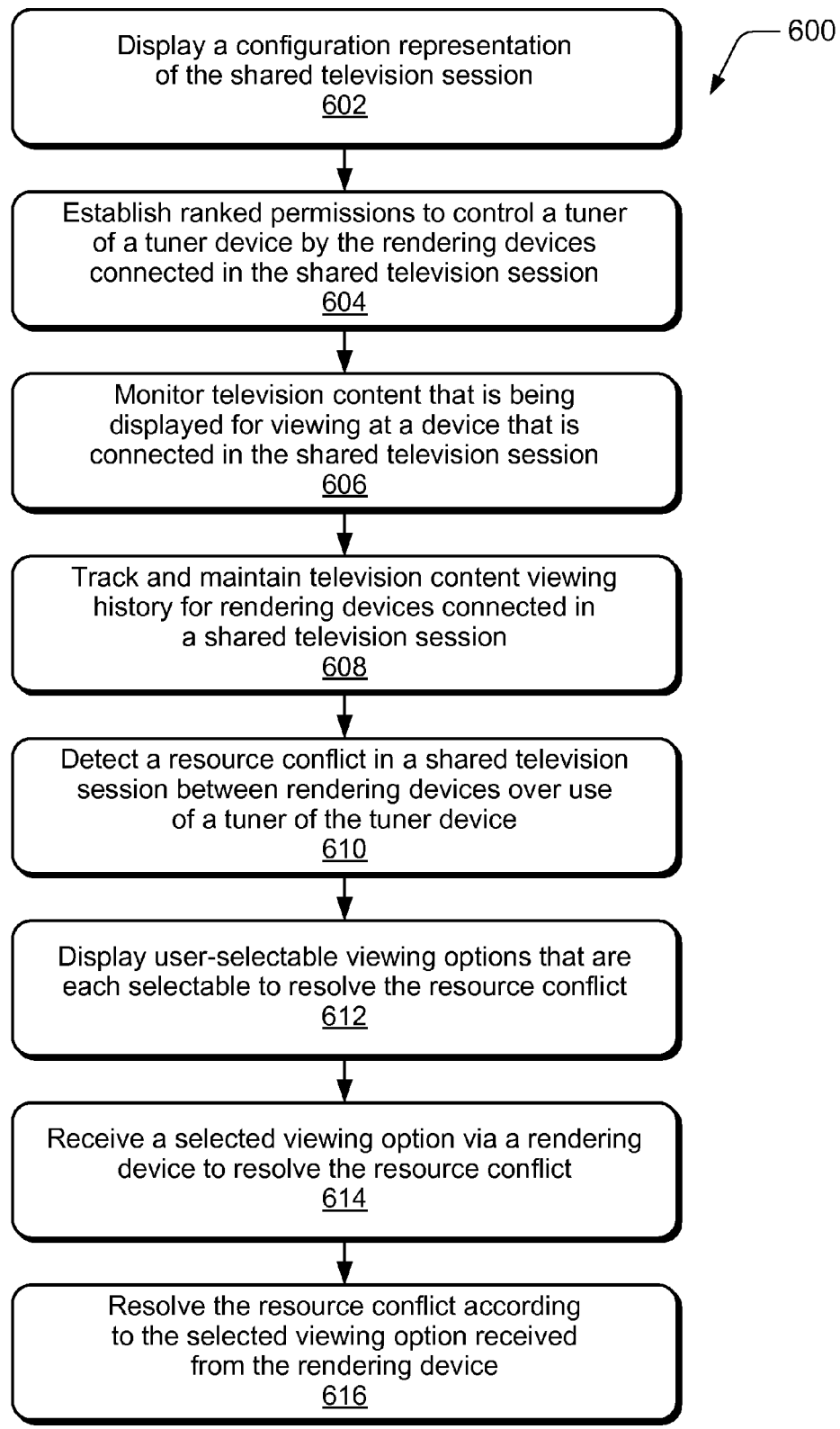
FIG. 6 illustrates example method(s) for shared television sessions in accordance with one or more embodiments.

FIG. 6 illustrates example method(s) 600 of shared television sessions. The order in which the method is described is not intended to be construed as a limitation, and any number of the described method blocks can be combined in any order to implement the method, or an alternate method.

At block 602, a configuration representation of a shared television session is displayed. For example, configuration representation 156 of a shared television session is displayed, and the configuration representation includes images that each represent a rendering device connected in the shared television session. The images that each represent a rendering device connected in a shared television session in the configuration representation 156 can also be color-coded or include any other distinct visual feature to indicate permissions, session settings, configuration settings, tuner control, and the like.

At block 604, ranked permissions to control a tuner of a tuner device are established for rendering devices that are connected in the shared television session. For example, session manager 148 at a rendering device 132 establishes ranked permissions (e.g., configuration settings 152) to control a tuner 136 of the tuner device 130 for each device that is connected in a shared television session 150. The configuration settings 152 rendering device 132 can include session settings and permissions for a particular device in the shared session network 102. Permissions that correspond to a rendering device and/or to a user that is associated with a particular rendering device can be utilized to control access when a join request is received to join a shared television session. The rendering devices that are connected in a shared television session 150 can be ranked by the permissions that correspond to the respective devices and/or the users that are associated with the rendering devices, such as identified by a login code.

At block 606, television content is monitored as it is being displayed for viewing at a device that is connected in the shared television session. For example, session manager 148 at a rendering device 132 initiates monitoring what is being displayed for viewing at another rendering device that is connected in a shared television session. When joining a shared television session quietly to monitor what is being displayed, a user at one device in the shared session network 102 views the television content that is being displayed for viewing at another rendering device without the viewer at the other device knowing. Alternatively, a user at a rendering device in the shared session network 102 views the television content that is being displayed for viewing at another rendering device with notification to the viewer at the other device so that the viewer is aware the television content is being monitored.

At block 608, a television content viewing history is tracked and maintained for devices that are connected in shared television sessions. For example, session manager 148 at a rendering device 132 tracks and maintains a television content viewing history for rendering devices connected in a shared television session. A history of channel changes and/or selected television content is stored for future access to monitor television viewing at the rendering devices in the shared session network 102.

At block 610, a resource conflict is detected for a shared television session between rendering devices over use of a tuner of the tuner device. For example, session manager 148 at a rendering device 132 detects a resource conflict for a shared television session 150.

At block 612, user-selectable viewing options are displayed that are each selectable to resolve the resource conflict. For example, session manager 148 initiates a display of user-selectable viewing options that each resolve the resource conflict when a viewing option is selected. The session manager 148 can also initiate communication of the user-selectable viewing options for display at the rendering devices connected in a shared television session, such as a user interface of other viewing options 160, any one of which can be selected to mitigate the resource conflict by connecting the gaming device 116 in a different shared television session. A user can select a shared television session as a viewing option for shared viewing from a list of available tuners and/or shared television sessions.

At block 614, a selected viewing option is received from the rendering device and, at block 616, the resource conflict is resolved according to the selected viewing option received from the rendering device. For example, session manager 148 at a rendering device 132 receives a selected viewing option as an input from another rendering device and resolves the resource conflict according to the selected viewing option. A user selection or control input to a user interface can be initiated with an input device, such as with the keyboard 128, a mouse, or other pointing device at computer device 118. A user control input can also be initiated with the remote control device 124 at television client device 114, or with the game controller 126 at gaming device 116.

Figure 7:
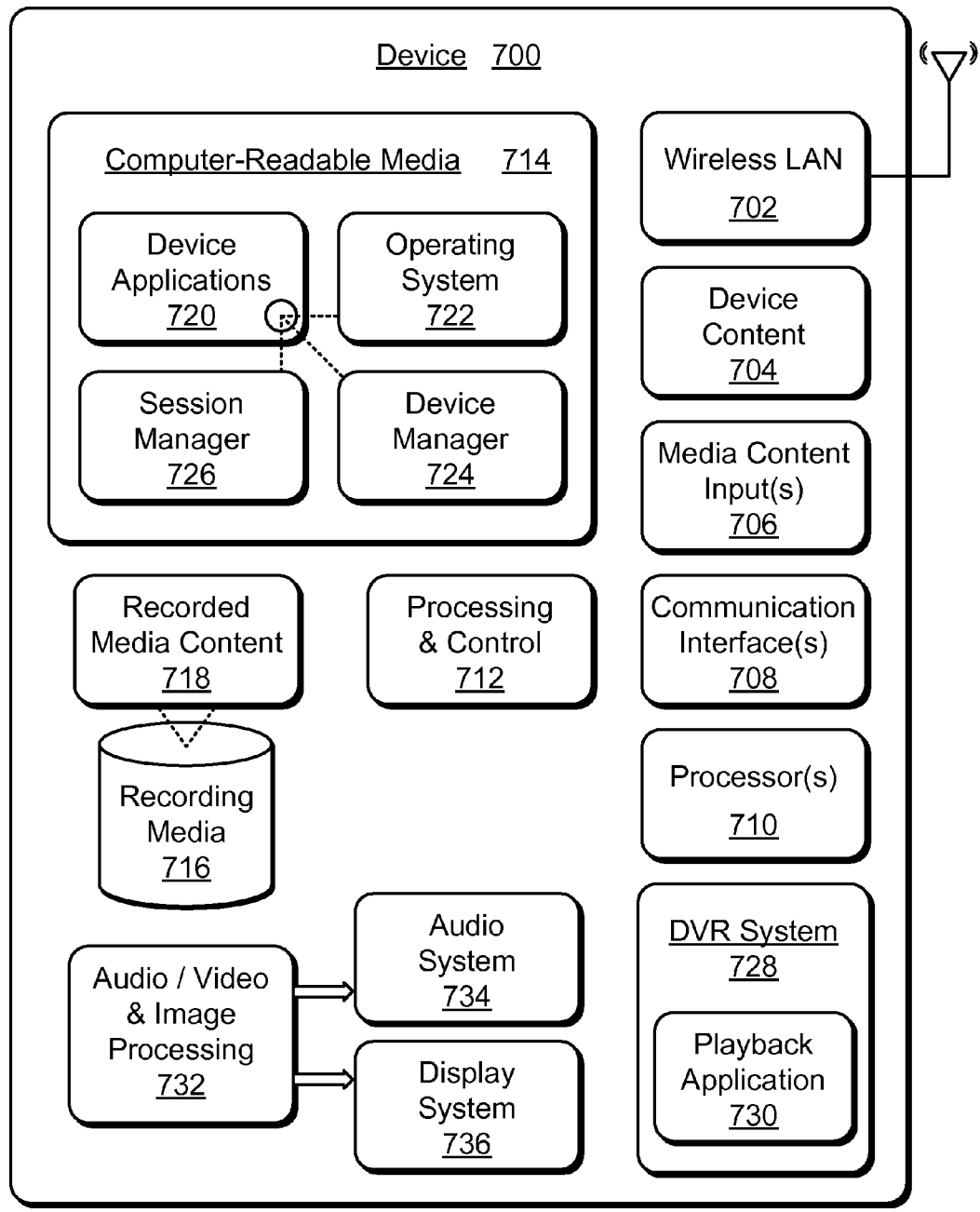
FIG. 7 illustrates various components of an example device that can implement embodiments of shared television sessions.

FIG. 7 illustrates various components of an example device 700 that can be implemented as any type of client or television device as described with reference to FIG. 1 to implement embodiments of shared television sessions. In embodiment(s), device 700 can be implemented as any one or combination of a wired and/or wireless device, as any form of television client device (e.g., television set-top box, digital video recorder (DVR), etc.), computer device, portable computer device, media device, communication device, video processing and/or rendering device, appliance device, gaming device, electronic device, and/or as any other type of device that can be implemented to receive media content in any form of audio, video, and/or image data. Device 700 may also be associated with a user (i.e., a person) and/or an entity that operates the device such that a device describes logical devices that include users, software, firmware, and/or a combination of devices.

Device 700 includes wireless LAN (WLAN) components 702, that enable wireless communication of device content 704 or other data (e.g., received data, data that is being received, data scheduled for broadcast, data packets of the data, etc.). The device content 704 can include session configuration settings, configuration settings of the device, media content stored on the device, and/or information associated with a user of the device. Media content stored on device 700 can include any type of data as well as audio, video, and/or image media content. Device 700 can also include one or more media content inputs 706 via which any type of media content can be received, such as music, television media content, recorded video content, and any other type of audio, video, and/or image content received from a content source which can then be processed, rendered, and/or displayed for viewing.

Device 700 can also include communication interfaces 708 that can be implemented as any one or more of a serial and/or parallel interface, a wireless interface, any type of network interface, a modem, and as any other type of communication interface. The communication interfaces 708 provide a connection and/or communication links between device 700 and a communication network by which other electronic, computing, and communication devices can communicate data with device 700.

Device 700 can include one or more processors 710 (e.g., any of microprocessors, controllers, and the like) which process various computer-executable instructions to control the operation of device 700 and to implement embodiments of shared television sessions. Alternatively or in addition, device 700 can be implemented with any one or combination of hardware, firmware, or fixed logic circuitry that is implemented in connection with processing and control circuits which are generally identified at 712. Although not shown, device 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 700 can also include computer-readable media 714, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like. Device 700 may also include a recording media 716 to maintain recorded media content 718 that device 700 receives and/or records.

Computer-readable media 714 provides data storage mechanisms to store the device content 704, as well as various device applications 720 and any other types of information and/or data related to operational aspects of device 700. For example, an operating system 722 can be maintained as a computer application with the computer-readable media 714 and executed on the processors 710. The device applications 720 can also include a device manager 724 and a session manager 726. In this example, the device applications 720 are shown as software modules and/or computer applications that can implement various embodiments of shared television sessions.

When implemented as a television client device, device 700 can also include a DVR system 728 with a playback application 730 that can be implemented as a media control application to control the playback of recorded media content 718 and/or any other audio, video, and/or image content that is rendered and/or displayed for viewing. The recording media 716 can maintain recorded media content that may include media content when it is received from a content distributor and recorded. For example, media content can be recorded when received as a viewer-scheduled recording, or when the recording media 716 is implemented as a pause buffer that records streaming media content as it is being received and rendered for viewing.

Device 700 can also include an audio, video, and/or image processing system 732 that provides audio data to an audio system 734 and/or provides video or image data to a display system 736. The audio system 734 and/or the display system 736 can include any devices or components that process, display, and/or otherwise render audio, video, and image data. The audio system 734 and/or the display system 736 can be implemented as integrated components of the example device 700. Alternatively, audio system 734 and/or the display system 736 can be implemented as external components to device 700. Video signals and audio signals can be communicated from device 700 to an audio device and/or to a display device via an RF (radio frequency) link, S-video link, composite video link, component video link, DVI (digital video interface), analog audio connection, or other similar communication link.

Although embodiments of shared television sessions have been described in language specific to features and/or methods, it is to be understood that the subject of the appended claims is not necessarily limited to the specific features or methods described. Rather, the specific features and methods are disclosed as example implementations of shared television sessions.

The invention claimed is:

1. A method, comprising:
   receiving television content via a tuner of a tuner device;
   establishing a shared television session between rendering devices that share the tuner of the tuner device to receive the television content;
   receiving a join request to join the shared television session from an additional rendering device;
   causing display of the join request at one or more of the rendering devices that share the tuner;
   joining the additional rendering device to the shared television session if an approval of the join request is received from at least one of the rendering devices that share the tuner;
   receiving a tuner configuration input to change the television content from one of the rendering devices that share the tuner;
   receiving different television content via the tuner of the tuner device according to the tuner configuration input; and
   communicating tuner update data associated with the tuner configuration input to update the rendering devices that share the tuner of the tuner device to receive the different television content.

2. The method as recited in claim 1, wherein prior to receiving the join request, the method further comprising:
   causing display of user-selectable viewing options at the additional rendering device, the user-selectable viewing options including the shared television session that can be selected to join.

3. The method as recited in claim 1, wherein if the approval to the join request is not received and a disapproval to the join request is also not received, the method further comprises:
   determining whether the additional rendering device has corresponding permission settings that allow the additional rendering device to join the shared television session;
   determining whether the rendering devices connected in the shared television session have corresponding permission settings that allow the additional rendering device to join them in the shared television session; and
   at least one of denying joining the additional rendering device in the shared television session according to the permission settings, or said joining the additional rendering device in the shared television session according to the permission settings.

4. The method as recited in claim 1, further comprising displaying a notification at the rendering devices connected in the shared television session that the additional rendering device is joining the shared television session responsive to joining the additional rendering device to the shared television session.

5. The method as recited in claim 1, further comprising:
   displaying available rendering devices that a user can select to join in the shared television session;
   receiving user-initiated join selections to join selected ones of the available rendering devices in the shared television session; and
   joining the selected ones of the available rendering devices in the shared television session to receive the television content via the tuner of the tuner device and display the television content for viewing at the selected ones of the available rendering devices.

6. The method as recited in claim 1, wherein a subset of the rendering devices are not permissioned to initiate the tuner configuration input.

7. The method as recited in claim 1, further comprising receiving a content playback input at a rendering device, the content playback input being communicated to the tuner device to at least one of control a playback position of the television content or control a playback speed of the television content, and wherein the rendering devices connected in the shared television session receive the television content according to the content playback input.

8. The method as recited in claim 1, further comprising displaying a configuration representation of the shared television session, the configuration representation including images that each represent a rendering device connected in the shared television session.

9. The method as recited in claim 1, further comprising denying joining the additional rendering device in the shared television session if a disapproval of the join request is received from at least one of the rendering devices that share the tuner.

10. A shared television session system, comprising:
    a tuner device that includes a tuner configured to receive television content from a content distributor;
    rendering devices each configured to receive the television content via the tuner of the tuner device;
    a session manager configured to:
      establish a shared television session between the rendering devices that share the tuner of the tuner device to receive the television content;
      receive a tuner configuration input when initiated at a rendering device to initiate changing the television content;
      initiate communication of the tuner configuration input to the tuner device to receive different television content via the tuner according to the tuner configuration input;
      initiate communication of tuner update data associated with the tuner configuration input to update the rendering devices that are further configured to share the tuner of the tuner device to receive the different television content;
      receive a join request to join the shared television session from an additional rendering device;

cause display of the join request from the additional rendering device at one or more of the rendering devices that share the tuner;

deny joining the additional rendering device if a join deny input is received from one of the rendering devices that share the tuner; and join the additional rendering device if a join accept input is received from the rendering devices that share the tuner.

11. The shared television session system as recited in claim 10, wherein if neither the join deny input nor the join accept input is received, the session manager is further configured to:

determine whether the additional rendering device has corresponding permission settings that allow the additional rendering device to join the shared television session;

determine whether the rendering devices connected in the shared television session have corresponding permission settings that allow the additional rendering device to join them in the shared television session; and at least one of deny joining the additional rendering device in the shared television session according to the permission settings, or said join the additional rendering device in the shared television session according to the permission settings.

12. The shared television session system as recited in claim 10, wherein the session manager is further configured to initiate a notification display at the rendering devices connected in the shared television session when the additional rendering device is joined to the shared television session.

13. The shared television session system as recited in claim 10, wherein the session manager is further configured to select an existing shared television session to join the additional rendering device in the existing shared television session without receiving the join request from the additional rendering device.

14. The shared television session system as recited in claim 10, wherein a rendering device connected in the shared television session is configured to initiate a display of available rendering devices that a user can select to join in the shared television session, and wherein the session manager is further configured to:

receive user-initiated join selections to join selected ones of the available rendering devices in the shared television session; and join the selected ones of the available rendering devices in the shared television session to receive the television content via the tuner of the tuner device and display the television content for viewing at the selected ones of the available rendering devices.

15. The shared television session system as recited in claim 10, wherein a subset of the rendering devices are not permissioned to initiate the tuner configuration input.

16. The shared television session system as recited in claim 10, wherein the session manager is further configured to:

receive a content playback input when initiated at a rendering device, the content playback input configured to at least one of control a playback position of the television content or control a playback speed of the television content; and communicate the content playback input to the tuner device, and wherein the rendering devices connected in the shared television session receive the television content according to the content playback input.

17. The shared television session system as recited in claim 10, wherein the session manager is further configured to initiate display of a configuration representation of the shared television session, the configuration representation including images that each represent a rendering device connected in the shared television session.

18. A computer-readable memory having instructions stored thereon that, when executed by a processor, perform a method comprising:

receiving television content via a tuner of a tuner device;

establishing a shared television session to enable rendering devices to share the tuner of the tuner device to receive the television content;

receiving a join request to join the shared television session from a rendering device;

causing display of the join request at one or more rendering devices that are already connected in the shared television session; and joining the rendering device in the shared television session if an approval of the join request is received from each of the rendering devices that are already connected in the shared television session.

19. The computer-readable memory as recited in claim 18, wherein the instructions, when executed by the processor, perform a method further comprising denying joining the rendering device in the shared television session if a disapproval of the join request is received from at least one of the rendering devices that are already connected in the shared television session.

20. The computer-readable memory as recited in claim 18, wherein the instructions, when executed by the processor, perform a method further comprising, if the approval of the join request is not received and a disapproval of the join request is also not received, joining or denying joining the rendering device in the shared television session based on established permissions associated with the rendering device to join with each of the rendering devices in the shared television session.

* * * * *